United States Patent
Zhang et al.

(10) Patent No.: US 11,247,704 B2
(45) Date of Patent: Feb. 15, 2022

(54) ACTIVATION APPARATUS OF RAILWAY VEHICLE AND RAILWAY VEHICLE HAVING ACTIVATION APPARATUS

(71) Applicant: CRRC QINGDAO SIFANG CO., LTD., Qingdao (CN)

(72) Inventors: Huiqing Zhang, Qingdao (CN); Qi Yuan, Qingdao (CN); Miao Wang, Qingdao (CN); Baoqiang Shan, Qingdao (CN); Yinan Mou, Qingdao (CN)

(73) Assignee: CRRC QINGDAO SIFANG CO., LTD., Qingdao (CN)

( * ) Notice: Subject to any disclaimer, the term of this patent is extended or adjusted under 35 U.S.C. 154(b) by 608 days.

(21) Appl. No.: 16/304,349

(22) PCT Filed: Sep. 29, 2018

(86) PCT No.: PCT/CN2018/108721
§ 371 (c)(1),
(2) Date: Nov. 26, 2018

(87) PCT Pub. No.: WO2020/042274
PCT Pub. Date: Mar. 5, 2020

(65) Prior Publication Data
US 2021/0221408 A1  Jul. 22, 2021

(30) Foreign Application Priority Data
Aug. 29, 2018  (CN) .......................... 201821410114.3

(51) Int. Cl.
*B61C 17/12* (2006.01)
*B61L 21/04* (2006.01)
*B61L 27/00* (2006.01)

(52) U.S. Cl.
CPC .............. *B61C 17/12* (2013.01); *B61L 21/04* (2013.01); *B61L 27/00* (2013.01)

(58) Field of Classification Search
CPC ........... B61C 17/12; B61L 21/04; B61L 27/00
See application file for complete search history.

(56) References Cited

U.S. PATENT DOCUMENTS

| | | | | |
|---|---|---|---|---|
| 2005/0231147 A1* | 10/2005 | Urman | ................. | H03K 17/962 318/465 |
| 2019/0052187 A1* | 2/2019 | Geske | .................. | H02M 7/483 |

FOREIGN PATENT DOCUMENTS

| | | |
|---|---|---|
| CN | 103318193 A | 9/2013 |
| CN | 103847748 A | 6/2014 |

(Continued)

OTHER PUBLICATIONS

International Search Report for corresponding application PCT/CN2018/108721 dated Jun. 5, 2019.

*Primary Examiner* — Jason C Smith
(74) *Attorney, Agent, or Firm* — Cantor Colburn LLP

(57) ABSTRACT

Disclosed are an activation apparatus of a railway vehicle and a railway vehicle having activation apparatus. The activation apparatus being disposed in each carriage of the railway vehicle containing a plurality of marshallings, the activation apparatus comprising: a target power supply, connected with an activation busbar through a first branch, wherein the activation busbar runs through the railway vehicle containing the plurality of marshallings; and a circuit switch, configured to control a state of the first branch, wherein the state comprising one of the followings: a disconnection state and a connection state. The present disclosure solves the technical problem in the related art in (Continued)

which a current railway vehicle activation mode cannot allow all control carriages to activate and control a corresponding railway vehicle.

9 Claims, 2 Drawing Sheets

(56) References Cited

FOREIGN PATENT DOCUMENTS

| CN | 104832026 | A | * | 8/2015 |
|---|---|---|---|---|
| CN | 104832026 | A | | 8/2015 |
| CN | 204645940 | U | | 9/2015 |
| CN | 204920534 | A | | 12/2015 |
| CN | 106347413 | A | | 1/2017 |
| CN | 106428045 | A | * | 2/2017 |
| CN | 106428045 | A | | 2/2017 |

* cited by examiner

ACTIVATION APPARATUS OF RAILWAY VEHICLE AND RAILWAY VEHICLE HAVING ACTIVATION APPARATUS

TECHNICAL FIELD

The present disclosure relates to the field of activation of railway vehicles, and in particular to an activation apparatus of a railway vehicle and a railway vehicle having activation apparatus.

BACKGROUND

Current railway vehicle activation modes all refer to activation by cabs at both ends. These activation modes are no longer applied to coupling vehicles. That is, current railway vehicle activation modes all refer to activation by cabs at both ends, which cannot allow all control carriages to activate and control a corresponding railway vehicle.

An effective solution has not been proposed yet currently for the technical problem in the related art in which a current railway vehicle activation mode cannot allow all control carriages to activate and control a corresponding railway vehicle.

SUMMARY

At least some embodiments of the present disclosure provides an activation apparatus of a railway vehicle and a railway vehicle having activation apparatus, intended to solve the technical problem in the related art in which a current railway vehicle activation mode cannot allow all control carriages to activate and control a corresponding railway vehicle.

In an embodiment of the present disclosure, an activation apparatus of a railway vehicle is provided. The activation apparatus is disposed in each carriage of a railway vehicle containing a plurality of marshallings, the activation apparatus comprising: a target power supply, connected with an activation busbar through a first branch, wherein the activation busbar runs through the railway vehicle containing the plurality of marshallings; and a circuit switch, configured to control a state of the first branch, wherein the state comprising one of the followings: a disconnection state and a connection state.

Further, the activation apparatus further comprising: a first touch controller, wherein one end of the first touch controller is connected with the target power supply through the circuit switch, the first touch controller is configured to control the first branch to be in a closed state when receiving a current signal sent by the target power supply.

Further, wherein the other end of the first touch controller is connected with a negative line through a second branch, and the activation apparatus further comprises: a second touch controller, wherein one end of the second touch controller is connected with the activation busbar, the other end of the second touch controller is connected with the negative line, and the second touch controller is configured to control the second branch to be in a disconnected state when receiving a current signal sent by the activation busbar.

Further, wherein the other end of the first touch controller is further connected with the negative line through a third branch, and the first touch controller is further configured to control the third branch to be in a connected state when receiving the current signal sent by the target power supply.

Further, wherein the first branch is provided with a first normally open contact, wherein the first normally open contact is closed when the first touch controller receives the current signal sent by the target power supply.

Further, wherein the second branch is provided with a normally closed contact, wherein the normally closed contact is disconnected when the second touch controller receives the current signal sent by the activation busbar.

Further, wherein the third branch is provided with a second normally open contact, wherein the second normally open contact is closed when the first touch controller receives the current signal sent by the target power supply.

Further, the activation apparatus further comprising: a circuit breaker, wherein one end of the circuit breaker is connected with the target power supply, and the other end of the circuit breaker is connected with at least one of the first branch and the first touch controller for protecting the activation apparatus.

In another embodiment of the present disclosure, a carriage is provided. The carriage includes: the activation apparatus of a railway vehicle according to the above contents.

In another embodiment of the present disclosure, a railway vehicle containing a plurality of marshallings is provided. The railway vehicle containing a plurality of marshallings includes: the above carriage.

In the present disclosure, the activation apparatus is disposed in a carriage of a railway vehicle containing a plurality of marshallings, and the activation apparatus includes: a target power supply, connected with an activation busbar through a first branch, wherein the activation busbar runs through the railway vehicle containing the plurality of marshallings; and a circuit switch, configured to control a state of the first branch, wherein the state comprising one of the followings: a disconnection state and a connection state. The technical problem in the related art in which a current railway vehicle activation mode cannot allow all control carriages to activate and control a corresponding railway vehicle is solved. The activation apparatus being disposed in each carriage of the railway vehicle containing a plurality of marshallings, and a target power supply of the activation apparatus is connected with an activation busbar of the railway vehicle containing the plurality of marshallings, so that the carriage provided with the activation apparatus may activate and control a corresponding railway train.

BRIEF DESCRIPTION OF THE DRAWINGS

The drawings forming a part of the present disclosure are intended to provide a further understanding of the present disclosure. The schematic embodiments and illustrations of the present disclosure are intended to explain the present disclosure, and do not form improper limits to the present disclosure. In the drawings.

The drawings include the following reference signs:

10: target power supply; 20: circuit switch; 30: first touch controller; 40: second touch controller; 50: circuit breaker; 31: first normally open contact; 32: second normally open contact; 41: normally closed contact; 61:

first branch; 62: second branch; 63: third branch; 64: activation busbar; 65: negative line.

DETAILED DESCRIPTION OF THE EMBODIMENTS

The technical solutions in the embodiments of the present invention will be clearly and completely described hereinbelow with the drawings in the embodiments of the present invention. It is apparent that the described embodiments are only part of the embodiments of the present invention, not all of the embodiments. The following description of at least one exemplary embodiment is only illustrative actually, and is not used as any limitation for the present invention and the application or use thereof. On the basis of the embodiments of the present invention, all other embodiments obtained on the premise of no creative work of those of ordinary skill in the art fall within the scope of protection of the present invention.

Figure 1:
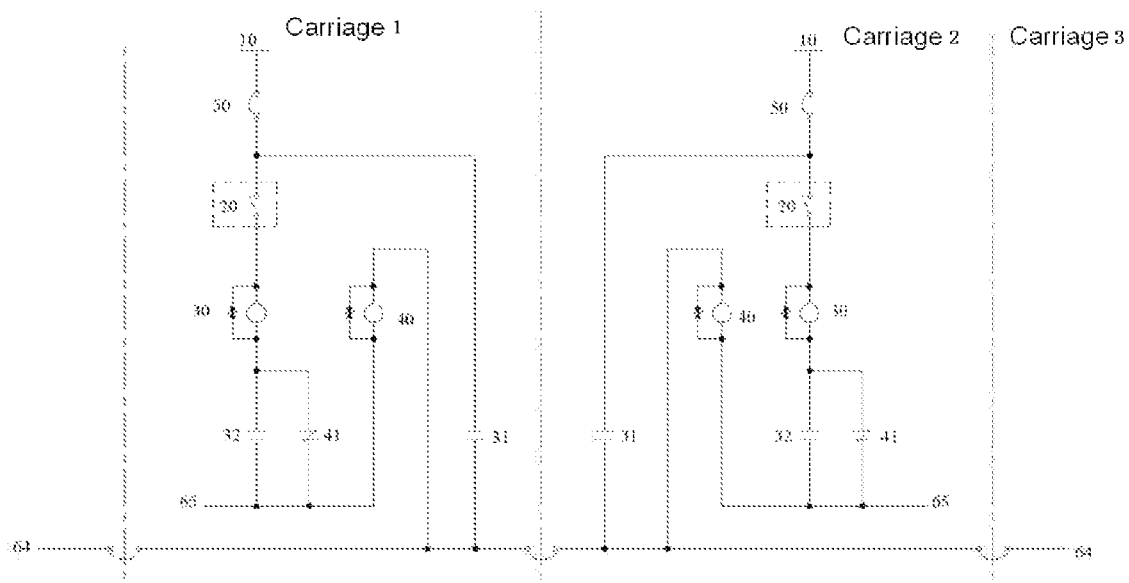
FIG. 1 shows a schematic diagram of an activation apparatus of a railway train according to an embodiment of the present disclosure.
Figure 2:
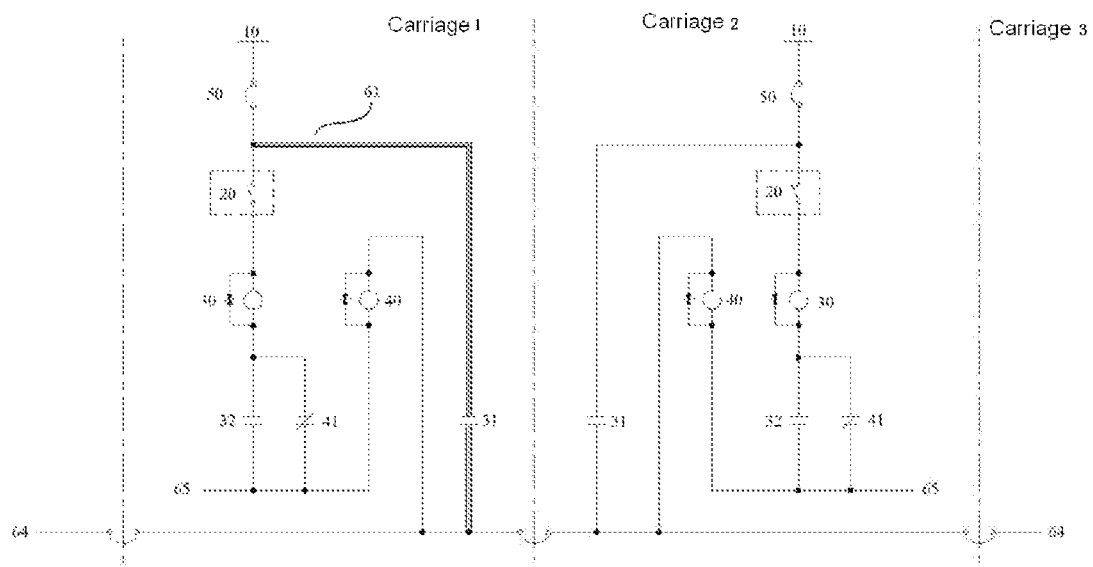
FIG. 2 shows a schematic diagram of the position of a first branch in the activation apparatus in FIG. 1.

As shown in FIG. 1 and FIG. 2, an embodiment of the present invention provides an activation apparatus of a railway vehicle. The activation apparatus being disposed in each carriage of the railway vehicle containing a plurality of marshallings, the activation apparatus comprising: a target power supply 10, connected with an activation busbar 64 through a first branch 61, wherein the activation busbar 64 runs through the railway vehicle containing the plurality of marshallings; and a circuit switch 20, configured to control a state of the first branch (61), wherein the state comprising one of the followings: a disconnection state and a connection state.

According to the technical solution of the present embodiment, the activation apparatus being disposed in each carriage of the railway vehicle containing a plurality of marshallings, and a target power supply of the activation apparatus is connected with an activation busbar of the railway vehicle containing the plurality of marshallings, so that the carriage provided with the activation apparatus may activate and control a corresponding railway train.

That is, by connecting the target power supply 10 disposed in the carriage to the activation busbar 64 of the railway vehicle containing a plurality of marshallings, the carriage is permitted to activate and control the corresponding railway vehicle, so as to solve the technical problem in which a current railway vehicle activation mode cannot allow a control carriage in a railway vehicle containing a plurality of marshallings to activate and control a corresponding railway vehicle.

In an optional example, as shown in FIG. 1, a dashed box on the periphery of the circuit switch 20 represents a motorman controller, that is, the circuit switch 20 is a motorman controller switch, and a crew member can open the circuit switch 20 with a motorman controller key.

In addition, in order to ensure that a carriage preferentially operating the circuit switch 20 is permitted to preferentially activate a railway train, in the present embodiment, the activation apparatus further includes a first touch controller 30 and a second touch controller 40.

Figure 3:
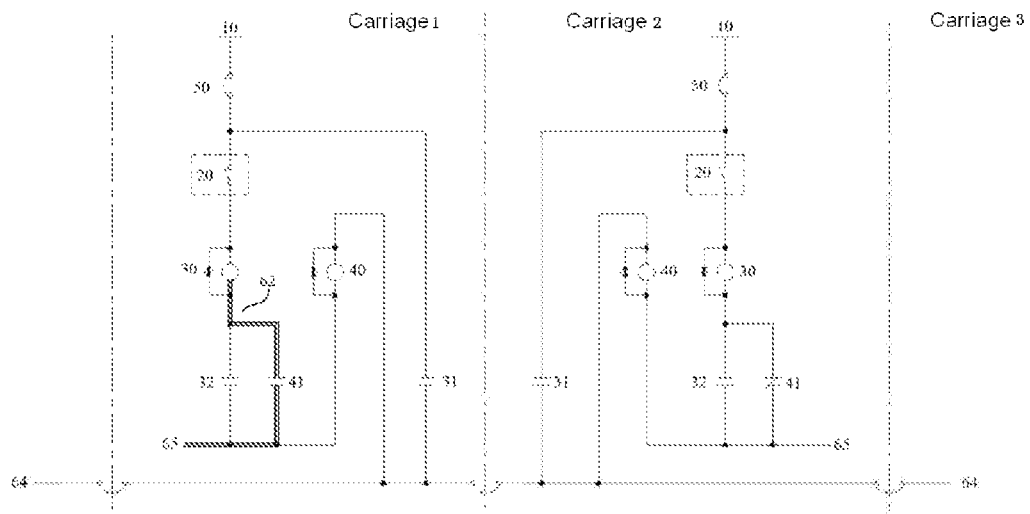
FIG. 3 shows a schematic diagram of the position of a second branch in the activation apparatus in FIG. 1.

As shown in FIG. 3, one end of the first touch controller 30 is connected with the target power supply 10 through the circuit switch 20, the other end of the first touch controller 30 is connected with a negative line 65 through a second branch 62, and the first touch controller is configured to control the first branch 61 to be in a closed state when receiving a current signal sent by the target power supply 10.

One end of the second touch controller 40 is connected with the activation busbar 64, the other end of the second touch controller 40 is connected with the negative line 65, and the second touch controller is configured to control the second branch 62 to be in a disconnected state when receiving a current signal sent by the activation busbar 64.

The first touch controller 30 is designed in such a way that the first touch controller 30 is connected with the target power supply 10 through the circuit switch 20, the circuit switch 20 may control the first touch controller 30 to receive a current signal sent by the activation busbar 64 or not. That is, when the circuit switch 20 is closed, the first touch controller 30 can receive the current signal sent by the activation busbar 64. When the circuit switch 20 is disconnected, the first touch controller 30 cannot receive the current signal sent by the activation busbar 64. In addition, the first touch controller 30 controls the first branch 61 to be in a closed state when receiving the current signal sent by the target power supply 10, so that a disconnection or connection state of the first branch 61 for circulation of a large current may be controlled by a small current signal sent by the target power supply 10, that is, the technical effect of controlling the operation of "large current" by "small current" is achieved, thus improving the safety performance of the activation apparatus.

In addition, the other end of the first touch controller 30 is connected with the negative line 65 through the second branch 62. In addition, one end of the first touch controller 30 is connected with the target power supply 10, and the other end is connected with the negative line 65 to form a closed loop, so as to provide a path for charge circulation. The situation that only one end of the first touch controller 30 is connected with the target power supply 10 through the circuit switch 20 to cause that a closed loop cannot be formed even if the circuit switch 20 is closed and the first touch controller 30 cannot receive a current signal sent by the target power supply 10 is avoided.

The second touch controller 40 is designed in such a way that the second touch controller 40 controls the second branch 62 to be in a disconnected state when receiving the current signal sent by the activation busbar 64, so that after the activation busbar 64 of the railway vehicle is electrified, the second touch controller 40 cuts off the closed loop of the first touch controller 30, thereby avoiding the situation that the first touch controller 30 receives the current signal sent by the target power supply 10 to control the first branch 61 to be in a connected state. That is, after other carriages activate the activation busbar 64 of the railway vehicle, the second touch controller 40 cuts off the closed loop of the first touch controller 30 of a carriage where the second touch controller 40 is located, and the first touch controller 30 cannot receive the current signal sent by the target power supply 10 and cannot even connect the first branch 61, so as to ensure that the carriage where the activation busbar 64 is electrified is preferentially permitted to preferentially activate a train.

For example, as shown in FIG. 1, after carriage 1 activates the activation busbar 64 of the railway vehicle, the activation busbar 64 of the railway vehicle is electrified. Since the second touch controller 40 of another carriage such as carriage 2 or carriage 3 is connected with the activation busbar 64, the second touch controller 40 of another carriage such as carriage 2 or carriage 3 receives the current signal sent by the activation busbar 64, thus controlling the second branch 62 of another carriage such as carriage 2 or carriage 3 to be in a disconnected state. At this time, even if the circuit switch 20 of another carriage such as carriage 2 or carriage 3 is closed, the closed loop of the first touch controller 30 of another carriage such as carriage 2 or carriage 3 is still in a cut-off state, the current signal sent by the target power supply 10 cannot be still acquired, and the first branch 61 cannot be controlled to be in a connected state, so that only one carriage of the railway vehicle can activate the activation busbar 64 of the railway vehicle.

Figure 4:
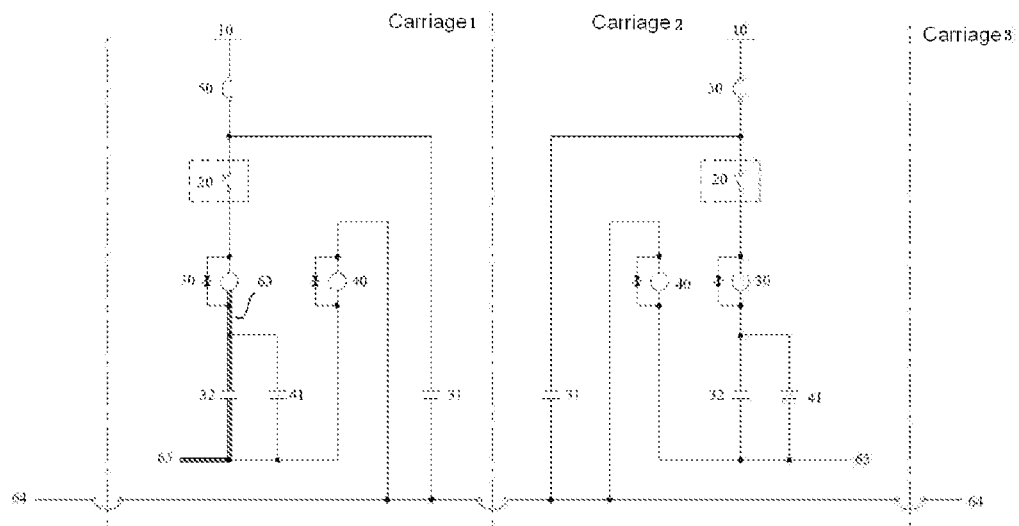
FIG. 4 shows a schematic diagram of the position of a third branch in the activation apparatus in FIG. 1.

Finally, as shown in FIG. 4, in the present embodiment, the other end of the first touch controller 30 is also connected with the negative line 65 through a third branch 63, and the first touch controller 30 is further configured to control the third branch 63 to be in a connected state when receiving the current signal sent by the target power supply 10. By such design, the situation that the first touch controller 30 cannot continuously receive the current signal sent by the target power supply 10 to control the first branch 61 to be closed due to the fact that the second touch controller 40 of a carriage where the first touch controller 30 is located receives the current signal sent by the activation busbar 64 to disconnect the second branch 62 after the first touch controller 30 controls the first branch 61 to be closed is avoided. That is, after the first touch controller 30 controls the first branch 61 to be closed, even if the second touch controller 40 disconnects the second branch 62, the first touch controller 30 may also be connected with the negative line 65 through a third branch 63, thereby achieving the technical effect of protecting the closed loop of the first touch controller 30 to make the first touch controller 30 able to continuously acquire the current signal sent by the target power supply 10, so that the activation apparatus provided by the present embodiment may stably operate.

In a preferred example of the present embodiment, the first touch controller 30 is an activation relay, and the second touch controller 40 is a power control relay. When receiving the current signal sent by the target power supply 10, the activation relay is in an activated state, and when receiving the current signal sent by the activation busbar 64, the power control relay is in an activated state.

Further, in a preferred example of the present embodiment, the first branch 61 is provided with a first normally open contact 31, wherein the first normally open contact 31 is closed when the first touch controller 30 receives the current signal sent by the target power supply 10. That is, when the first touch controller 30 is in an activated state, the first normally open contact 31 is closed, and when the first touch controller 30 is not activated, the first normally open contact 31 is in a disconnected state.

In a preferred example of the present embodiment, the second branch 62 is provided with a normally closed contact 41, wherein the normally closed contact 41 is disconnected when the second touch controller 40 receives the current signal sent by the activation busbar 64. That is, when the second touch controller 40 is in an activated state, the normally closed contact 41 is disconnected, and when the second touch controller is not activated, the normally closed contact 41 is closed.

In a preferred example of the present embodiment, the third branch 63 is provided with a second normally open contact 32, wherein the second normally open contact 32 is closed when the first touch controller 30 receives the current signal sent by the target power supply 10. That is, when the first touch controller 30 is in an activated state, the second normally open contact 32 is closed, and when the first touch controller 30 is not activated, the second normally open contact 32 is disconnected.

In conclusion, by providing the first normally open contact 31, the second normally open contact 32 and the normally closed contact 41, the first touch controller 30 and the second touch 40 may control the disconnection or connection state of the first branch 61, the second branch 62 and the third branch 63 based on a current state (whether a current signal is received).

In addition, as another optional example, the activation apparatus further includes a circuit breaker 50, wherein one end of the circuit breaker 50 is connected with the target power supply 10, and the other end is connected with the first branch 61 for protecting the activation apparatus. By such design, when current in the first branch 61 is abnormal, for example, when the first branch 61 is short-circuited or seriously overloaded, the circuit breaker 50 may actively cut off power supplied to the activation busbar 64 of the railway train by the target power supply 10 through the first branch 61, thus protecting the activation apparatus.

Similarly, in another optional example, the other end of the circuit breaker 50 included in the activation apparatus is connected with the first touch controller 30. When current in the activation apparatus is abnormal, for example, when the closed loop of the first branch 30 is short-circuited or seriously overloaded, the circuit breaker 50 may actively cut off power supplied to the first touch controller 30 by the target power supply 10, thus protecting the activation apparatus.

Another embodiment of the present invention provides a carriage, including an activation apparatus of a railway vehicle, wherein the activation apparatus of a railway vehicle is the activation apparatus of a railway vehicle provided by the above embodiment.

According to the technical solution of the present embodiment, an activation apparatus is disposed in a carriage, and a target power supply 10 of the activation apparatus is connected with an activation busbar 64 of the railway vehicle, thus achieving the technical effect that the carriage provided with the activation apparatus may activate and control a corresponding railway vehicle.

That is, by connecting the target power supply 10 disposed in the carriage to the activation busbar 64 of the railway vehicle, the carriage is permitted to activate and control the corresponding railway vehicle, so as to solve the technical problem in which a current railway vehicle activation mode cannot allow a control carriage in a railway vehicle to activate and control a corresponding railway vehicle.

Another embodiment of the present invention provides a railway vehicle containing a plurality of marshallings, including multiple carriages, wherein the carriage is the carriage provided by the above embodiment. According to the technical solution of the present embodiment, an activation apparatus is disposed in a carriage of a railway vehicle containing a plurality of marshallings, and a target power supply 10 of the activation apparatus is connected with an activation busbar 64 of the railway vehicle containing a plurality of marshallings, thus achieving the technical effect that the carriage provided with the activation apparatus may activate and control a corresponding railway vehicle.

That is, by connecting the target power supply 10 disposed in the carriage to the activation busbar 64 of the railway vehicle containing a plurality of marshallings, the carriage is permitted to activate and control the corresponding railway vehicle, so as to solve the technical problem in which a current railway vehicle activation mode cannot allow a control carriage in a railway vehicle containing a plurality of marshallings to activate and control a corresponding railway vehicle.

The above is only the preferred embodiments of the present invention, not intended to limit the present invention. As will occur to those skilled in the art, the present invention is susceptible to various modifications and changes. Any modifications, equivalent replacements, improvements and the like made within the spirit and principle of the present invention shall fall within the scope of protection of the present invention.

It is to be noted that the terminology used herein is just for the purpose of describing the embodiments, and is not intended to limit the embodiments. As used herein, the singular forms are also intended to include the plural, unless the context clearly indicates otherwise, and it is also understood that when the terms "include" and/or "include" are used in the specification, which refers to features, steps, operations, devices, components, and/or combinations thereof.

The relative arrangement of the components and the steps, numerical expressions and numerical values set forth in the embodiments are not intended to limit the scope of the invention. In the meantime, it should be understood that the dimensions of the various parts shown in the drawings are not drawn in the actual scale relationship for the convenience of description. Techniques, methods and apparatus known to those of ordinary skilled in the relevant art may not be discussed in detail, but where appropriate, the techniques, methods and apparatus should be considered as part of the authorization specification. In all of the examples shown and discussed herein, any specific values are to be construed as illustrative only and not as a limitation. Accordingly, other examples of the exemplary embodiments may have different values. It should be noted that similar reference numerals and letters indicate similar items in the following figures, and therefore, once an item is defined in one drawing, it is not required to be further discussed in the subsequent figures.

In the description of the present disclosure, it is to be understood that the orientation words such as "front, back, up, down, left, right", "horizontal, vertical" and "top, bottom", etc., are used based on the orientation or positional relationship shown in the drawings, and is merely for the convenience of the description of the present invention and the simplified description, which are not intended to indicate or imply that the components must have a specific orientation or be constructed and operated in a specific orientation, and thus are not to be construed as limiting the scope of the invention; the orientations "inside and outside" refer to the inside and outside of the contours of the components themselves.

For convenience of the description of the present disclosure, the spatially relative terms such as "above", "over", "on", etc., may be used herein to describe the spatial positional relationships between one device or features and other devices or features in the drawings. It will be understood that the spatially relative terms are intended to encompass different orientations of the device in the use or operation in addition to the orientation of the device described in the figures. For example, if the device in the figures is up side down, the device described as "above other devices or structures" or "over other devices or structures" will be positioned "below other devices or structures" or "under other devices or structures". Thus, the exemplary term "above" can include both positions "over" and "under". The device can also be positioned in other different ways (rotated 90 degrees or in other orientations) and the corresponding description of the space used herein is explained accordingly.

In addition, it should be noted that the use of the words "first", "second", etc. to limit the components is only to facilitate the distinction between the components, if there is no additional statements, the above words have no special meaning, so it cannot be understood to limit the scope of protection of the present invention.

What is claimed is:

1. An activation apparatus of a railway vehicle, the activation apparatus being disposed in each carriage of the railway vehicle containing a plurality of marshallings, the activation apparatus comprising:
   a target power supply (10), connected with an activation busbar (64) through a first branch (61), wherein the activation busbar (64) runs through the railway vehicle containing the plurality of marshallings; and
   a circuit switch (20), configured to control a state of the first branch (61), wherein the state comprising one of the followings: a disconnection state and a connection state;
   the activation apparatus further comprising:
   a first touch controller (30), wherein one end of the first touch controller (30) is connected with the target power supply (10) through the circuit switch (20), the first touch controller (30) is configured to control the first branch (61) to be in a closed state when receiving a current signal sent by the target power supply (10).

2. The apparatus as claimed in claim 1, wherein the other end of the first touch controller (30) is connected with a negative line (65) through a second branch (62), and the activation apparatus further comprises:
   a second touch controller (40), wherein one end of the second touch controller (40) is connected with the activation busbar (64), the other end of the second touch controller (40) is connected with the negative line (65), and the second touch controller is configured to control the second branch (62) to be in a disconnected state when receiving a current signal sent by the activation busbar (64).

3. The apparatus as claimed in claim 2, wherein the other end of the first touch controller (30) is further connected with the negative line (65) through a third branch (63), and the first touch controller (30) is further configured to control the third branch (63) to be in a connected state when receiving the current signal sent by the target power supply (10).

4. The apparatus as claimed in claim 3, wherein the third branch (63) is provided with a second normally open contact (32), wherein the second normally open contact (32) is closed when the first touch controller (30) receives the current signal sent by the target power supply (10).

5. The apparatus as claimed in claim 2, wherein the second branch (62) is provided with a normally closed contact (41), wherein the normally closed contact (41) is disconnected when the second touch controller (40) receives the current signal sent by the activation busbar (64).

6. The apparatus as claimed in claim 1, wherein the first branch (61) is provided with a first normally open contact (31), wherein the first normally open contact (31) is closed when the first touch controller (30) receives the current signal sent by the target power supply (10).

7. The apparatus as claimed in claim 1, the activation apparatus further comprising:
   a circuit breaker (50), wherein one end of the circuit breaker (50) is connected with the target power supply (10), and the other end of the circuit breaker (50) is connected with at least one of the first branch (61) and the first touch controller (30) for protecting the activation apparatus.

8. A carriage, comprising an activation apparatus of a railway vehicle as claimed in claim 1.

9. A railway vehicle comprising a plurality of marshallings, comprising a plurality of carriages as claimed in claim 8.

\* \* \* \* \*